United States Patent
Nandam et al.

(10) Patent No.: US 11,451,087 B2
(45) Date of Patent: *Sep. 20, 2022

(54) UPS MAINTENANCE BYPASS SYSTEMS USING MODE SIGNALING

(71) Applicant: Eaton Intelligent Power Limited, Dublin (IE)

(72) Inventors: Pradeep Kumar Nandam, Cary, NC (US); David Glenn Miller, Clayton, NC (US); Scott Jason Davis, Youngsville, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,309

(22) Filed: Jan. 25, 2021

(65) Prior Publication Data

US 2021/0218270 A1    Jul. 15, 2021

Related U.S. Application Data

(63) Continuation of application No. 16/327,217, filed as application No. PCT/US2017/046870 on Aug. 15, 2017, now Pat. No. 10,903,683.

(60) Provisional application No. 62/378,983, filed on Aug. 24, 2016.

(51) Int. Cl.
*H02J 9/06* (2006.01)
*H01H 9/28* (2006.01)
*H01H 13/14* (2006.01)
*H01H 19/14* (2006.01)

(52) U.S. Cl.
CPC ............. *H02J 9/062* (2013.01); *H01H 9/282* (2013.01); *H01H 13/14* (2013.01); *H01H 19/14* (2013.01)

(58) Field of Classification Search
CPC ......... H02J 9/062; H01H 9/282; H01H 13/14; H01H 19/14
See application file for complete search history.

(56) References Cited

U.S. PATENT DOCUMENTS

| | | | |
|---|---|---|---|
| 5,081,367 A | 1/1992 | Smith | H02J 9/062 307/64 |
| 10,903,683 B2 * | 1/2021 | Nandam | H01H 19/14 |
| 2010/0187908 A1 | 7/2010 | Okano et al. | |

FOREIGN PATENT DOCUMENTS

CN    204167993    2/2015

* cited by examiner

*Primary Examiner* — Carlos Amaya
(74) *Attorney, Agent, or Firm* — Stanek Lemon Crouse & Meeks, P.A.

(57) ABSTRACT

A maintenance bypass (MBP) system for an uninterruptible power supply (UPS) includes a first switch having at least three positions that provide different couplings of a power source, a load, a power input of a UPS and a power output of a UPS and including a first contact set configured to indicate at least one transition between positions of the at least three positions. The system further includes a second switch configured to enable transition of the first switch between at least two of the positions and including a second contact set configured to indicate actuation of the second switch. The first switch may include a rotary switch and the second switch may include a pushbutton switch.

13 Claims, 8 Drawing Sheets

UPS MAINTENANCE BYPASS SYSTEMS USING MODE SIGNALING

RELATED APPLICATIONS

The present application is continuation of U.S. patent application Ser. No. 16/327,217 filed with the U.S. Patent & Trademark Office on Feb. 21, 2019 which is a 35 U.S.C. § 371 national phase application of PCT International Application No. PCT/US2017/046870, having an international filing date of Aug. 15, 2017 and was published as International Publication No. WO 2018/038965, claiming priority to U.S. Provisional Patent Application No. 62/378,983 filed Aug. 24, 2016. The disclosures of each application are incorporated herein by reference in their entireties.

BACKGROUND

The inventive subject matter relates to power distribution systems and methods and, more particularly, to uninterruptible power supply (UPS)
systems and methods.

UPS systems are commonly used in installations such as data centers, medical centers and industrial facilities. UPS systems may be used in such installations to provide backup power to maintain operation in event of failure of the primary utility supply.

Some UPS systems employ maintenance bypass (MBP) systems that allow maintenance personnel to safely service UPS components without disrupting power provided to the load. FIG. 1 illustrates an example of a UPS system having a conventional MBP arrangement. A UPS 30 includes a power train having converter circuitry 32, which may include, for example, a rectifier and inverter coupled by an intermediate DC bus, as is common in "on-line" UPS configurations. A static bypass switch (e.g., a semiconductor-based switch) 33 is configured to bypass the converter circuitry 32. This static bypass switch 33 may be closed, for example, when the UPS 30 is operating in an increased-efficiency mode when operation of the converter circuitry 32 is unnecessary to provide desired power quality and may unnecessarily increase losses. The static bypass switch 33 may also be closed when, for example, the converter circuitry 32 malfunctions.

An MBP assembly 40 is configured to selectively couple a power source 10 and a load 20 to one another and to the UPS 30. In some systems, the MBP assembly 40 may include a rotary switch 41 having "UPS", "Line" and "Service" switch positions. In the "UPS" position, the switch 41 may couple the power source 10 to the power input of the UPS 30 and may couple the load 20 to the power output of the UPS 30. In this mode, the UPS 30 may be used to provide uninterruptible power to the load 20 such that, if the power source 10 fails, power may be provided to the load 20 by an alternative source (e.g., battery or capacitor) coupled to the converter circuitry 32. In the "Line" switch position (sometimes referred to as a "Bypass" position), the switch 41 may decouple the output of the UPS 30 from the power source 10 and directly couple the power source to the load 20. In this mode, the power input of the UPS 30 may remain connected to the power source 10 to maintain the converter circuitry 32 in an energized state, which may facilitate testing of the UPS 30 without disruption of the load 20. In the "Service" position, the switch 41 may decouple the UPS 30 from the power source 10 such that the UPS 30 is de-energized, which may enable maintenance personnel to safely remove and/or service the UPS 30 while the power source 10 remains coupled to the load 20 via the MBP assembly 40.

As further shown, the MBP assembly 40 may further include a pushbutton switch 42 that is mechanically interlocked with the rotary switch 41, such that the pushbutton switch 42 is pressed to enable rotation of the rotary switch 41. Actuation of the pushbutton switch 42 causes a state change in contacts thereof which are coupled to a controller 34 of the UPS 30. In response to transition of the pushbutton switch 41 contacts, the controller 34 may close the static bypass switch 33 to place the UPS 30 in a "bypassed" mode in which the static bypass switch 33 is closed.

SUMMARY

Some embodiments of the inventive subject matter provide a maintenance bypass (MBP) system for an uninterruptible power supply (UPS). The system includes a power input configured to be coupled to a power source, a power output configured to be coupled to a load, a MBP output configured to provide power to the UPS, and a MBP input configured to receive power from the UPS. The system also includes a first switch having first, second and third positions. The first position couples the power input to the MBP output and couples the power output to the MBP input. The second position couples the power input to the power output and the MBP output and decouples the MBP input from the power output. The third position couples the power input to the power output, decouples the MBP output from the power input and decouples the MBP input from the power output. The first switch also includes a first contact set configured to indicate a transition between the first and second positions. The system further includes a second switch configured to enable transition of the first switch between the first position and the second position and including a second contact set configured to indicate actuation of the second switch.

In some embodiments, movement of the first switch between the first and second positions requires actuation of the second switch and movement of the first switch between the second and third positions does not require actuation of the second switch.

In some embodiments, the first switch may include a rotary switch and the second switch may include a pushbutton switch.

The system may further include a lockout/tag out (LOTO) mechanism including a loop configured to receive a lock and configured to inhibit movement of the first switch from the third position to the second position when the lock is engaged in the loop. The LOTO mechanism may include a push button that translates the loop to an exposed position responsive to being depressed by a user and wherein the exposed position enables engagement of the lock in the loop.

Further embodiments provide a system including a UPS and a MBP assembly coupled to a power input and a power output of the UPS and configured to be coupled to a power source and to a load. The MBP assembly includes a first switch having first, second and third positions. The first position couples a power source to an input of the MBP output and couples a power output of the UPS to a load. The second position couples the power source to the power input of the UPS and decouples the power output of the UPS from the load. The third position couples the power source to the load, decouples the power output of the UPS from the load and decouples the power source from the power input of the UPS. The first switch also includes a first contact set configured to provide a first control signal to the UPS responsive to a transition of the first switch between the first and second positions. The MBP assembly further includes a second switch configured to enable transition of the first switch between the first position and the second position and including a second contact set configured to provide a second control signal to the UPS responsive to actuation of the second switch. The UPS may include converter circuitry, a bypass switch configured to bypass the converter circuitry in a closed state, and a controller configured to control the converter circuitry and the bypass switch responsive to the first and second control signals.

Still further embodiments provide a system including a first switch having at least three positions that provide different couplings of a power source, a load, a power input of a UPS and a power output of a UPS and including a first contact set configured to indicate at least one transition between positions of the at least three positions. The system further includes a second switch configured to enable transition of the first switch between at least two of the positions and including a second contact set configured to indicate actuation of the second switch. The first switch may include a rotary switch and the second switch may include a pushbutton switch.

DETAILED DESCRIPTION

Figure 1:
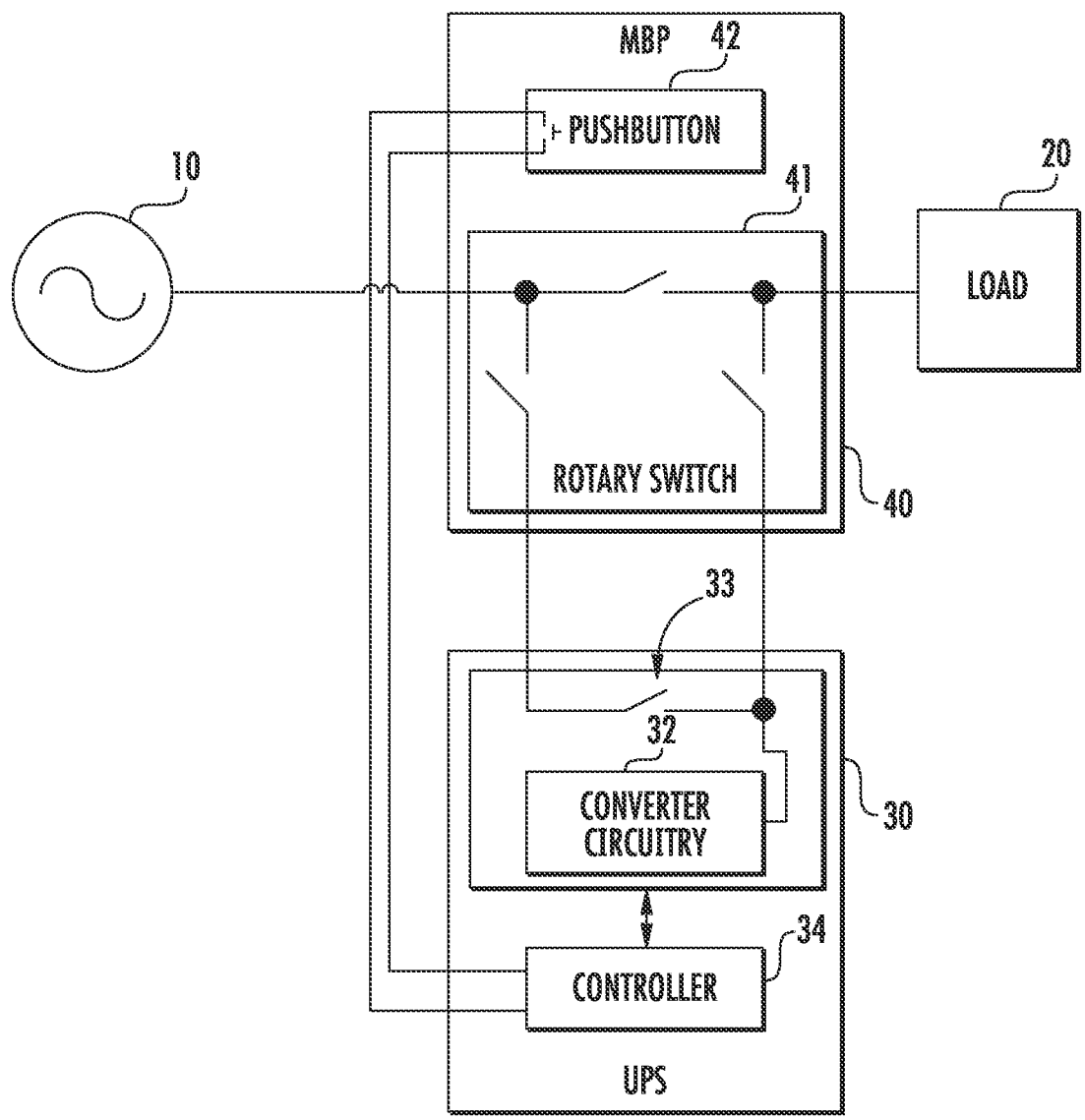
FIG. 1 is a schematic diagram illustrating a conventional maintenance bypass (MBP) arrangement.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
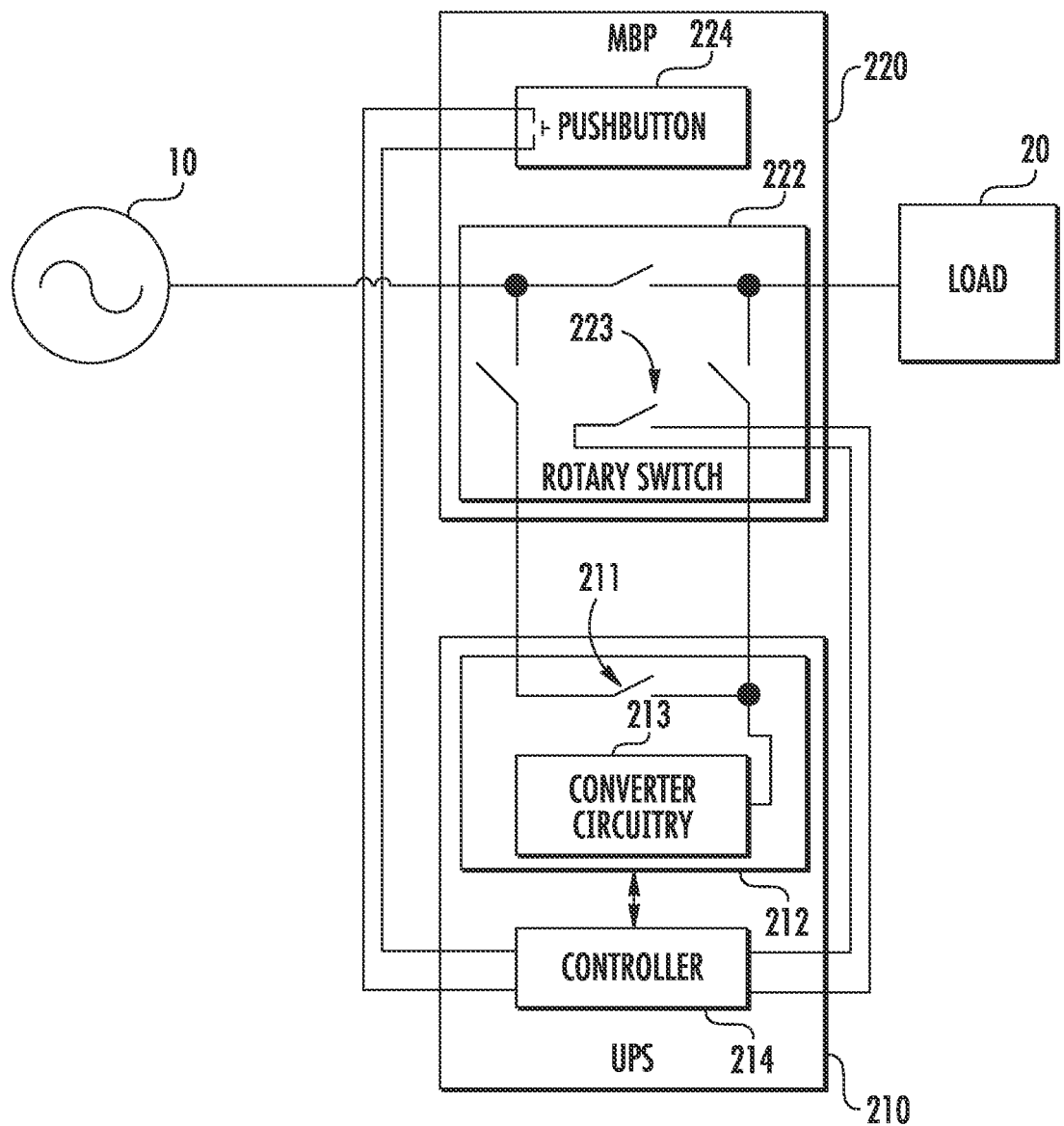
FIG. 2 is a schematic diagram illustrating a MBP arrangement according to some embodiments of the inventive subject matter.

FIG. 2 illustrates a system according to some embodiments of the inventive subject matter. The system includes a UPS 210 includes a power train 212 having converter circuitry 213. The converter circuitry 213 may take any of a number of forms. For example, in some embodiments, the converter circuitry 213 may have an "on-line" UPS configuration that includes a rectifier/inverter chain. Other embodiments may use other UPS topologies, such as standby UPS topologies. A static bypass switch (e.g., a semiconductor switch) 211 is configured to bypass the converter circuitry 213. A controller 214 controls operation of the power train 212.

A maintenance bypass (MBP) assembly 220 includes rotary switch 222 that is configured to selectively couple a power source 10 and a load 20 to one another and to the UPS 220. In a "UPS" position, the rotary switch 222 may couple the power source 10 to the power input of the UPS 210 and may couple the load 20 to the power output of the UPS 210. In a "Line" switch position, the rotary switch 222 may decouple the output of the UPS 210 from the power source 10 and directly couple the power source to the load 20. In the "Line" position, the rotary switch 22 also connected the power source 10 to the power input of the UPS 210, so that the UPS 210 may remain energized in this position for testing and other purposes. In a "Service" position, the switch 222 decouples the power input of the UPS 210 from the power source 10 such that the UPS 30 is de-energized to allow service personnel to remove or otherwise service the UPS 30.

As further shown, the MBP assembly 220 further includes a pushbutton switch 224 that is mechanically interlocked with the rotary switch 222. Movement of the rotary switch 222 from the "UPS" switch position to the "Line" position and movement from the "Line" position to the "UPS" position each require the user to press the pushbutton switch 224 to enable rotation of the rotary switch 222. Actuation of the pushbutton switch 224 causes a state change in contacts of the pushbutton switch 224 that are coupled to the controller 214 of the UPS 210. In response to transition of the pushbutton switch 224 contacts, the controller 214 may perform any of a variety of operations. For example, in some embodiments, the controller 214 may close the static bypass switch 211 to place the UPS 210 in a "bypassed" operational state before transition of the rotary switch 222 to the "Line" position.

Unlike conventional systems, movement between the "Line" and "Service" positions does not require actuation of the pushbutton switch 224. This can facilitate testing of the UPS 210. With the rotary switch 222 in the "Line" position, service personnel may manually place the UPS 210 into a "normal" mode in which power may be selectively provided to the output of the UPS 210 from the primary power source 10 and an auxiliary source (e.g., a battery) based on the state of the power source coupled to the power input of the UPS 210. With the UPS 210 in this "normal" mode, service personnel can test transition of the UPS to an "on battery mode" by turning the rotary switch 222 to the "Service" position. Allowing the maintenance personnel to switch from the "Service" state to the "Line" state without pressing the pushbutton switch 224 avoids closing of the contacts of the pushbutton switch 224 and triggering of the UPS 210 to the "bypassed" or other unwanted state.

The rotary switch 222 further includes a set of auxiliary contacts 223, which are coupled to the controller 214 of the UPS 210 and change state when the rotary switch 222 is moved between the "Line" position and the "UPS" position. These auxiliary contacts 223 may be used to indicate to the controller 214 that the rotary switch 222 has returned to the "UPS" position. In response to the transition of the rotary switch 222 to the "UPS" position, the controller 214 may place the power train 212 into a "normal" mode in which uninterruptible power provides power to the load from the primary power source 10 and falls back to an auxiliary source (e.g., a battery) in response to a failure of the primary power source 10.

Conventional systems such as that shown in FIG. 1 may place the UPS 30 in the "bypassed" state upon actuation of the interlock pushbutton 42 when switching of the MBP switch 41 to the "Line" position. Maintenance personnel that complete maintenance operations and place the switch 41 back to the "UPS" position may, however, inadvertently leave the UPS 30 in its "bypassed" state. If left in the "bypassed" state, the UPS 30 may not protect the load 20 if the primary power source 10 fails. In contrast, the auxiliary contacts 223 of the rotary switch 222 of FIG. 2 can be used to signal the transition of the switch 222 back to the "UPS" position, and the UPS controller 214 can responsively place the power train 212 in the "normal" mode so that the UPS 210 may protect the load 20 from an outage of the power source 10.

It will be appreciated that the switch arrangement shown in FIG. 2 is provided for purposes of illustration, and other embodiments may use different types and arrangements of switches. For example, while a rotary switch 222 is shown in FIG. 2, the same functionality may be provided by other types of multi-position switches, such as slide switches. While FIG. 2 shows a pushbutton switch 224 that interoperates with the rotary switch 222, other embodiments may use mechanically and/or electrically interlocking switches with other arrangements, such as lever-operated switches. Interoperation of the switches may be implemented using any of a number of different mechanisms.

Figure 3:
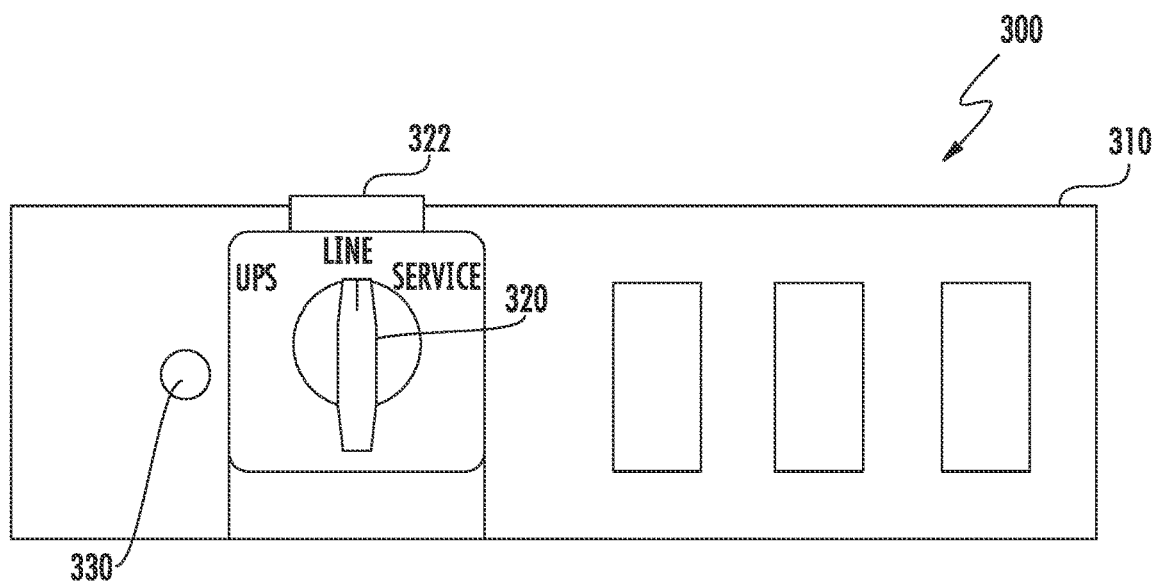
FIGS. 3-5 are front, top and back views of a MBP assembly according to further embodiments of the inventive subject matter.
Figure 4:
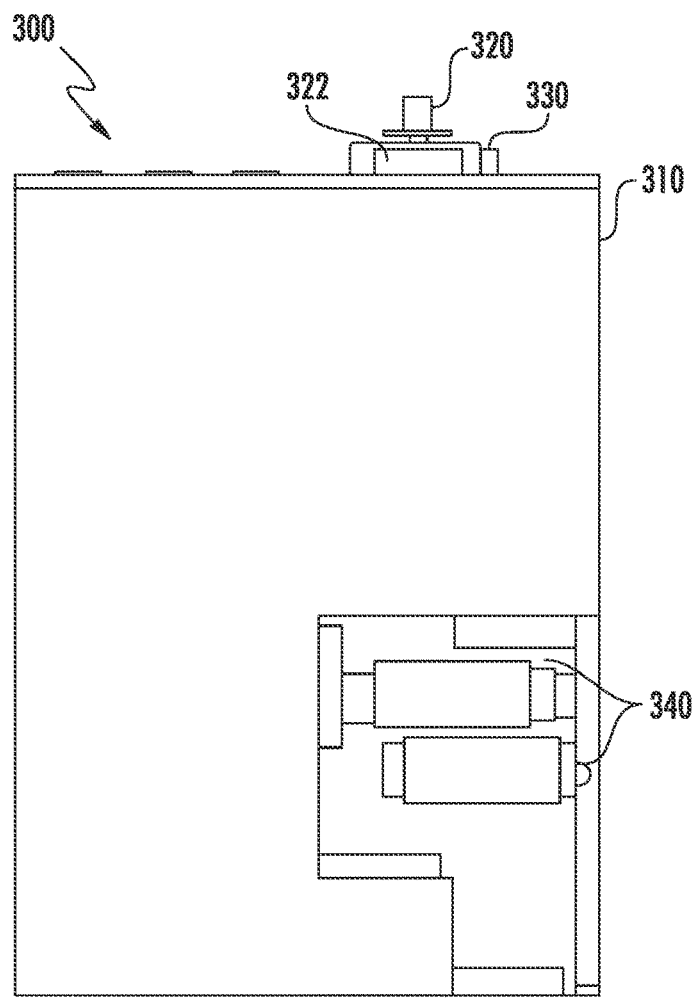
Figure 5:
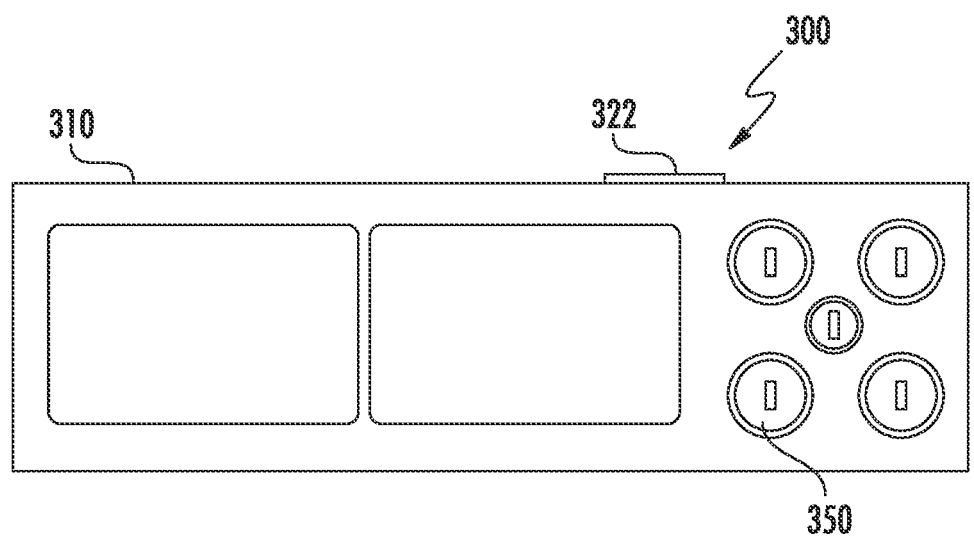

FIG. 3 illustrates a MBP assembly 300 according to further embodiments. The MBP assembly 300 includes a housing 310 that is configured to be installed in an equipment rack along with a UPS to which the MBP assembly 300 is connected. A rotary switch 320 and a pushbutton switch 330 that operate along the lines described above are positioned on a front face of the housing 310. Referring to FIGS. 4 and 5, terminal blocks 340 provide connections for the rotary switch 320 and the pushbutton switch 330, and access to the terminal blocks 340 may be provided via cutouts 350 on a rear face of the housing 310. The rotary switch 320 further includes an actuator 322 that is used to implement a "lock out/tag out" (LOTO) feature, described below with reference to FIG. 11.

Figure 6:
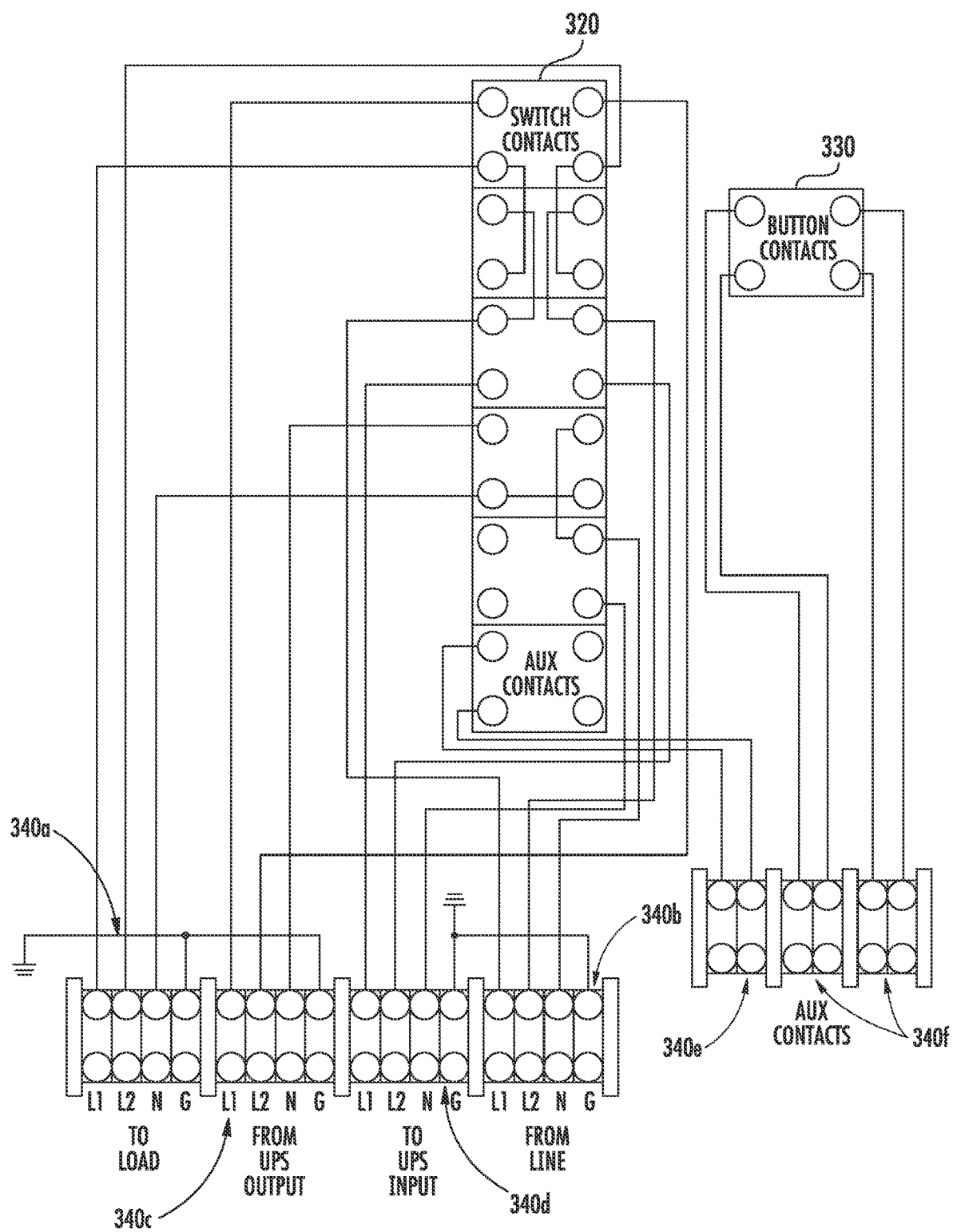
FIG. 6 is a schematic diagram illustrating interconnections of rotary and pushbutton switches of the MBP assembly of FIGS. 3-5.

FIG. 6 is a schematic diagram illustrating connections of the rotary switch 320 and the pushbutton switch of the MBP assembly 300 of FIGS. 3-5. Load and line connections of the rotary switch 320 are provided via first and second groups of terminals 340a, 340b. MBP input and output connections are provided via respective third and fourth groups of terminals 340c, 340d. Connections for auxiliary contacts of the rotary switch 320, i.e., contacts that may be used to sense transition of the rotary switch 320 from the "Line" position to the "UPS" position, are provided via a fifth group of terminals 340e. Connections to contacts of the pushbutton switch 330 are provided via a sixth group of terminals 340f. It will be appreciated that the auxiliary contacts of the rotary switch 320 and/or the contacts of the pushbutton switch 330 may include complementary "normally" open and "normally" closed" sets of contacts.

Figure 7:
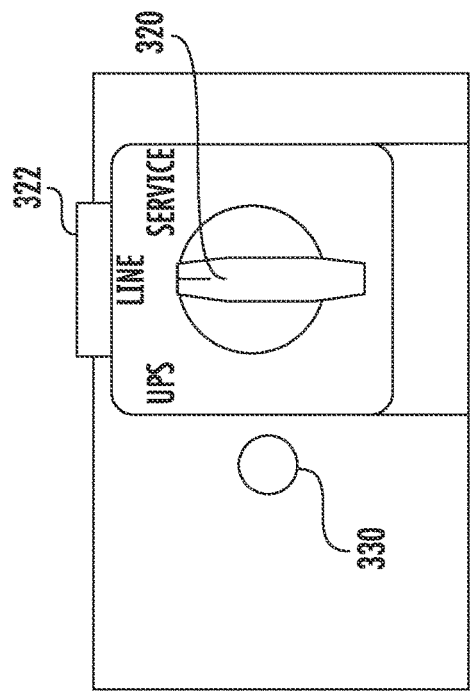
FIGS. 7-11 are front views of the MBP assembly of FIGS. 3-5 illustrating operations thereof.
Figure 7:
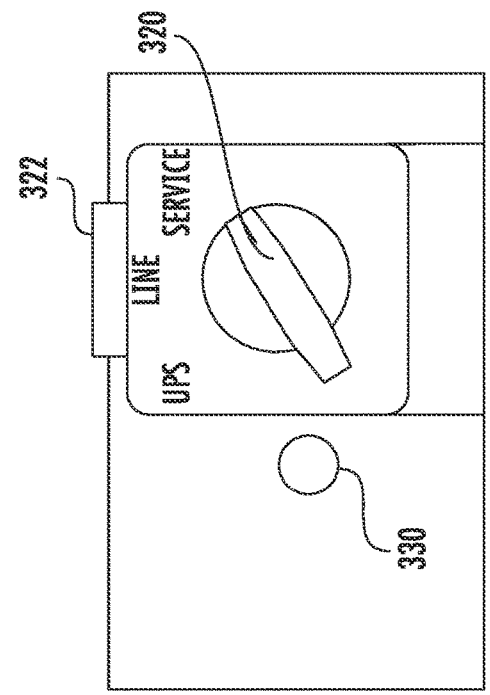

FIGS. 7-11 illustrate operations of the MBP assembly 300 according to some embodiments. Referring to FIG. 7, the rotary switch 320 is initially in the "UPS" position, wherein the rotary switch 320 couples a power source connected to a power input (i.e., the terminal group 340b of FIG. 6) of the MBP assembly 300 to a power input of a UPS, which is coupled to a MBP output (i.e., the terminal group 340d of FIG. 6) of the MBP assembly 300. In the "UPS" position, the rotary switch 320 also couples a power output of the UPS, which is connected to a MBP input (i.e., the terminal group 340c) of the MBP assembly 300, to a load connected to the power output (i.e., the terminal group 340a of FIG. 6) of the MBP assembly 300.

Still referring to FIG. 7, the MBP assembly 300 transitions to a "Line" mode by pressing and holding the pushbutton switch 330 while turning the rotary switch 320 to the "Line" position. As explained above with reference to FIG. 2, pressing the pushbutton switch 330 may generate a signal (i.e., via terminal group 340e shown in FIG. 6) to the connected UPS to place itself into a "bypassed" mode. In the "Line" position, the rotary switch 320 directly couples the external power source to the load, leaves the MBP input coupled to the external power source and decouples the power output of the connected UPS from the load. This position allows the connected UPS to remain energized for testing and other purposes while disconnected from the load.

Figure 8:
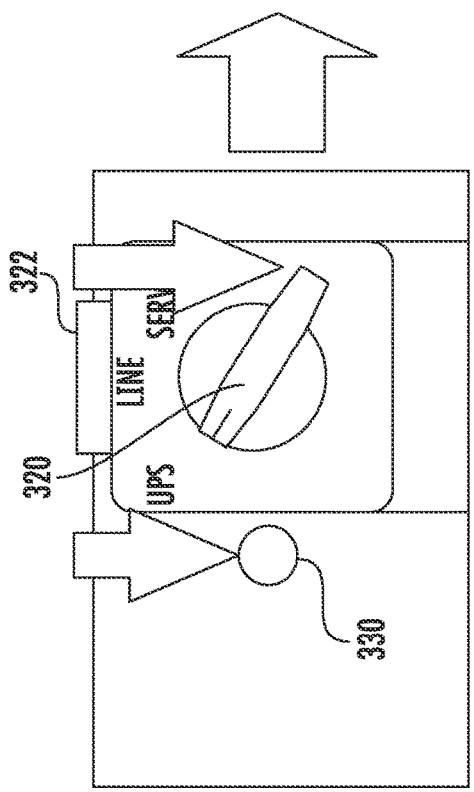
Figure 8:
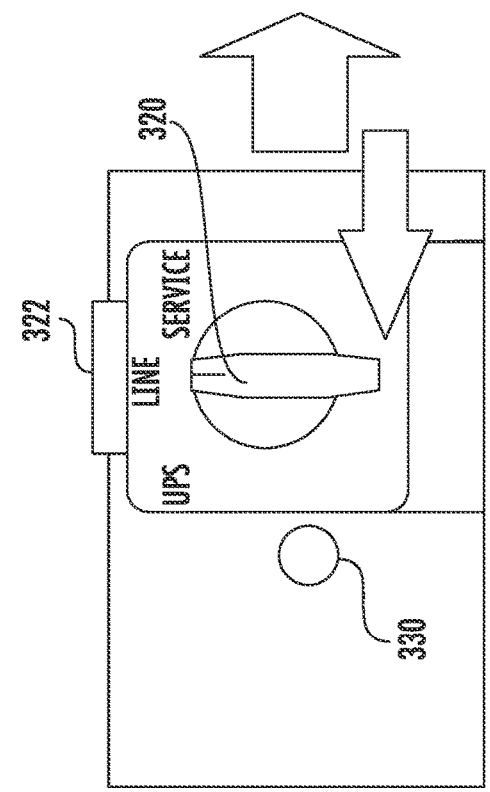

Referring to FIG. 8, the MBP assembly 300 may be transitioned to the "Service" mode by turning the rotary switch 320 to the "Service" position. In the "Service" mode, the rotary switch 320 decouples the power input of the UPS from the external power source and decouples the power output of the UPS from the external load, while leaving the power source directly coupled to the load. As explained above, this does not require pressing of the pushbutton switch 330. This transition may be used by service personnel to test transition of the connected UPS from "normal" to "on battery" mode. In particular, while the MBP assembly 300 is in "Line" mode, a technician can place the connected UPS (e.g., through its own user interface) into the "normal" mode of operation, with power being provided at the output of the UPS from the external source coupled to the power input of the UPS via the MBP assembly 300. Transition of the UPS to "on battery" mode may be achieved simply turning the rotary switch to the "Service position, which decouples the power input of the UPS from the external power source and automatically triggers a mode transition of the UPS.

Figure 9:
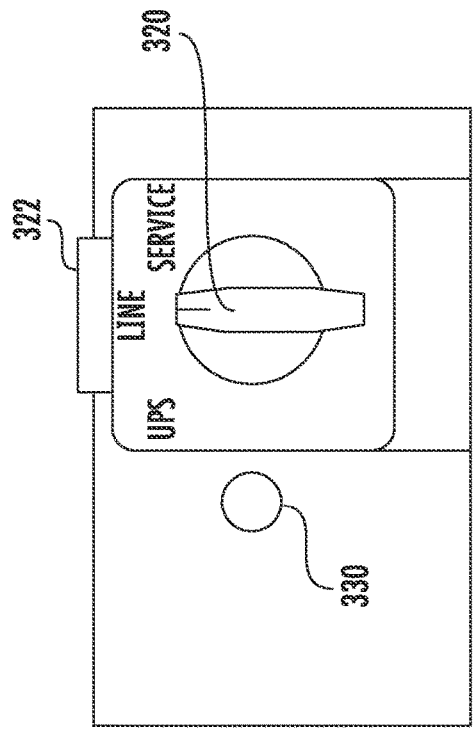
Figure 9:
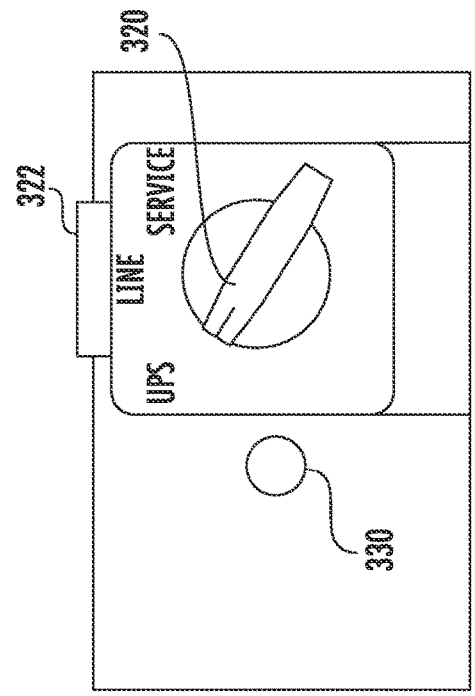

Referring to FIG. 9, the MBP assembly 300 may be transitioned back to the "Line" mode by turning the rotary switch 320 counterclockwise. As explained above, this transition also does not require pressing of the pushbutton switch 330. This transition may also be used by maintenance personnel to test transition back to "normal" mode from "on battery" mode. In particular, with the rotary switch 320 in the "Service" position and the UPS in an "on battery" mode, a technician can test transition of the UPS back to the normal" mode by simply turning the rotary switch 320 to the "Line" position.

Figure 10:
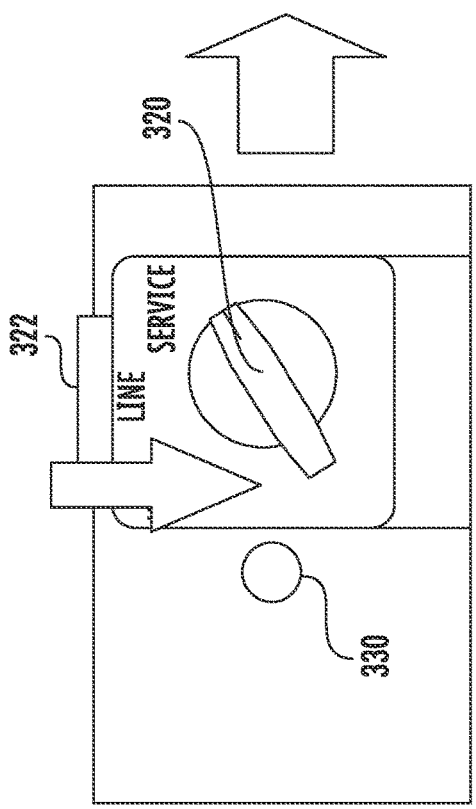
Figure 10:
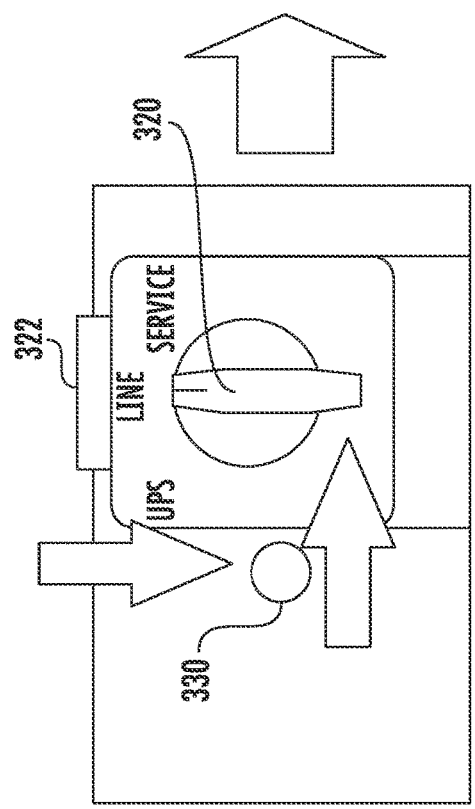

Referring to FIG. 10, the MBP assembly 300 may be transitioned to "UPS" mode by pressing and holding the pushbutton switch 330 and turning the rotary switch 320 to the "UPS" position. As explained above, this transition may cause a state transition of the auxiliary contacts (i.e., the contacts coupled to the terminal group 340e of FIG. 6) of the rotary switch 320. The connected UPS receives this signal and, if needed, can transition back to a "normal" operating mode so that it will be able to protect the load in the event the external power source fails.

Figure 11:
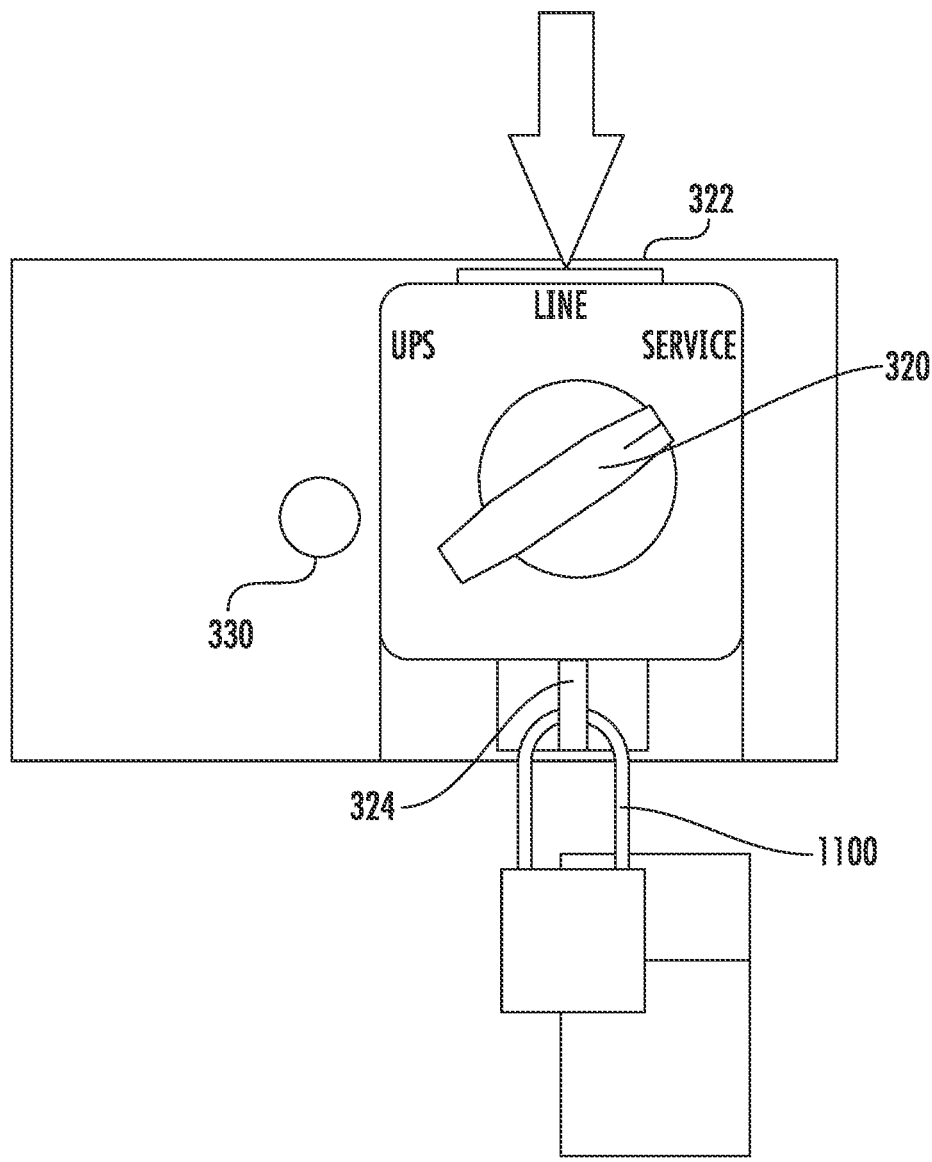

As mentioned above, the MBP unit may also be configured to provide a LOTO feature. Referring to FIG. 11 while the rotary switch 320 is in the "Service" position, the LOTO actuator 322 may be pressed, which results in movement of a LOTO loop 324 to an exposed position. In this position, rotation of the rotary switch 320 is inhibited. The LOTO mechanism may be retained in this locking position by inserting a LOTO tag 1100 into the exposed loop 324. This feature can prevent energizing of the connected UPS due to inadvertent movement of the rotary switch 320, and thus protect maintenance personnel working on the UPS.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
   a power input configured to be coupled to a power source;
   a power output configured to be coupled to a load;
   a maintenance bypass (MBP) output configured to provide power to an uninterruptible power supply (UPS);
   a MBP input configured to receive power from the UPS;
   a first manual switch having first, second and third positions, the first position coupling the power input to the MBP output and coupling the power output to the MBP input, the second position coupling the power input to the power output and the MBP output and decoupling the MBP input from the power output, the third position coupling the power input to the power output, decoupling the MBP output from the power input and decoupling the MBP input from the power output, the first switch further comprising a first contact set configured to indicate a transition between the first and second positions; and
   a second manual switch interlocked with the first switch such that transitions of the first switch between the first position and the second position are enabled by actuation of the second switch and comprising a second contact set configured to indicate actuation of the second switch, wherein the first switch is configured to transition between the second position and the third position without actuation of the second switch.

2. The system of claim 1, further comprising the UPS, wherein the UPS comprises converter circuitry, a static bypass switch configured to bypass the converter circuitry in a bypassed state of the UPS, and a control circuit coupled to the second contact set and configured to control the bypass switch to cause the UPS to transition to the bypassed state responsive to actuation of the second switch.

3. The system of claim 2, wherein the control circuit is configured to accept a user input to transition the UPS to a non-bypassed state while the first switch is in the second position.

4. The system of claim 3, wherein transition of the first switch from the second position to the third position while the UPS is in the non-bypassed state does not cause the control circuit to transition the UPS to the bypassed state.

5. The system of claim 1, wherein the first switch comprises a rotary switch having the first, second and third positions and wherein the second switch comprises a pushbutton switch.

6. The system of claim 1, further comprising a lockout/tagout (LOTO) mechanism comprising a loop configured to receive a lock and configured to inhibit movement of the first switch from the third position when the lock is engaged in the loop.

7. The system of claim 6, wherein the LOTO mechanism comprises a push button that translates the loop to an exposed position responsive to being depressed by a user and wherein the exposed position enables engagement of the lock in the loop.

8. A system comprising:
   a UPS comprising converter circuitry, a static bypass switch configured to bypass the converter circuitry in a bypassed state of the UPS, and a control circuit configured to control the bypass switch;
   a power input configured to be coupled to a power source;
   a power output configured to be coupled to a load;
   a maintenance bypass (MBP) output configured to provide power to the UPS;
   a MBP input configured to receive power from the UPS;
   a first manual switch having first, second and third positions, the first position coupling the power input to the MBP output and coupling the power output to the MBP input, the second position coupling the power input to the power output and the MBP output and decoupling the MBP input from the power output, the third position coupling the power input to the power output, decoupling the MBP output from the power input and decoupling the MBP input from the power output, the first switch further comprising a first contact set configured to indicate a transition between the first and second positions; and
   a second manual switch interlocked with the first switch such that transitions of the first switch between the first position and the second position are enabled by actuation of the second switch and comprising a second contact set configured to indicate actuation of the second switch, wherein the first switch is configured to transition between the second position and the third position without actuation of the second switch,
   wherein the control circuit is coupled to the second contact set and configured to cause the UPS to transition to the bypassed state responsive to actuation of the second switch.

9. The system of claim 8, wherein the control circuit is configured to accept a user input to transition the UPS to a non-bypassed state while the first switch is in the second position.

10. The system of claim 9, wherein transition of the first switch from the second position to the third position while the UPS is in the non-bypassed state does not cause the control circuit to transition the UPS to the bypassed state.

11. The system of claim 8, wherein the first switch comprises a rotary switch having the first, second and third positions and wherein the second switch comprises a push-button switch.

12. The system of claim 8, further comprising a lockout/tag out (LOTO) mechanism comprising a loop configured to receive a lock and configured to inhibit movement of the first switch from the third position when the lock is engaged in the loop.

13. The system of claim 12, wherein the LOTO mechanism comprises a push button that translates the loop to an exposed position responsive to being depressed by a user and wherein the exposed position enables engagement of the lock in the loop.

\* \* \* \* \*